(12) United States Patent
Buehler et al.

(10) Patent No.: US 7,398,843 B2
(45) Date of Patent: Jul. 15, 2008

(54) RECONFIGURABLE ROBOT DRIVE

(75) Inventors: Martin Buehler, Watertown, MA (US);
Aaron Saunders, Somerville, MA (US);
Felix Grimminger, Cambridge, MA (US)

(73) Assignee: Boston Dynamics, Inc., Cambridge, MA (US)

( * ) Notice: Subject to any disclaimer, the term of this patent is extended or adjusted under 35 U.S.C. 154(b) by 375 days.

(21) Appl. No.: 11/215,491

(22) Filed: Aug. 30, 2005

(65) Prior Publication Data

US 2007/0114075 A1    May 24, 2007

(51) Int. Cl.
*B62D 51/06* (2006.01)
(52) U.S. Cl. .................. 180/8.1; 180/8.2; 180/8.3; 180/24.02; 280/229; 280/5.2; 280/4.3
(58) Field of Classification Search ............ 180/8.1, 180/8.2, 8.3, 209, 24.02; 280/229, 5.2, 43, 280/6.157
See application file for complete search history.

(56) References Cited

U.S. PATENT DOCUMENTS

| | | | | |
|---|---|---|---|---|
| 3,109,506 | A * | 11/1963 | Schroter et al. | 180/8.1 |
| 5,249,847 | A * | 10/1993 | Lee | 301/105.1 |
| 5,667,235 | A * | 9/1997 | Pearce et al. | 280/304.1 |
| 6,481,513 | B2 * | 11/2002 | Buehler et al. | 180/8.6 |
| 7,240,969 | B2 * | 7/2007 | Gu | 301/5.1 |

* cited by examiner

*Primary Examiner*—Lesley D. Morris
*Assistant Examiner*—Michael Stabley
(74) *Attorney, Agent, or Firm*—Iandiorio Teska & Coleman

(57) ABSTRACT

A robot including a robot body, a plurality of wheels on the robot body for propelling the robot body, and an axle for each wheel. Each wheel is configured to alternately attach to an axle at or proximate the center of the wheel for high efficiency mobility on flat terrain and also configured to attach to an axle at a position offset from the center of the wheel for better mobility on rougher terrain.

15 Claims, 9 Drawing Sheets

US 7,398,843 B2

RECONFIGURABLE ROBOT DRIVE

FIELD OF THE INVENTION

This subject invention relates primarily to robotic devices but could also be used in connection with mobile platforms and other transportation devices and systems.

BACKGROUND OF THE INVENTION

A highly versatile and mobile six-legged mobile robot is disclosed in U.S. Pat. No. 6,481,513. That patent is incorporated herein by this reference. This robot exhibits unprecedented mobility on rough and difficult terrain. But, such a six-legged robot is not optimized for energy efficiency, smooth operation, payload ability, and range when used on flat terrain.

Conventional wheeled robots do exhibit higher energy efficiencies and ranges than legged and tracked robots when used on relatively flat terrain. But, such wheeled and tracked robots are unable to traverse rough and difficult terrain as well as legged robots.

To our knowledge, no prior robot design exhibits efficiency, smooth operation, payload capacity and the range of wheeled robots on flat terrain and also the ability of legged robots to successfully traverse rough terrain. Moreover, no prior robot designed for traversing terrain is also able to efficiently operate in aquatic environments.

SUMMARY OF THE INVENTION

It is therefore an object of this invention to provide a highly versatile robot able to traverse rough terrain but also efficient when deployed on relatively flat terrain.

It is a further object of this invention to provide such a robot which can be configured differently, manually or automatically, for operation on both flat and rough terrain.

It is a further object of this invention to provide such a robot which can also be used in aquatic environments.

The subject invention results from the realization that if the wheels of a robot can be attached to their corresponding axles at or proximate the center of each wheel, the robot is now more efficient on flat terrain; and, conversely, if the wheels can also be attached or moved such that the wheels are mounted on their respective axles at a position offset from the center of the wheel, the wheels act like legs and the robot is now able to traverse rougher terrain as well as climb steps and stairs.

The subject invention, however, in other embodiments, need not achieve all these objectives and the claims hereof should not be limited to structures or methods capable of achieving these objectives.

A robot in accordance with this invention features a robot body, a plurality of wheels on the robot body for propelling the robot body and an axle for each wheel. Each wheel is configured to alternately attach to an axle at or proximate the center of the wheel for high efficiency mobility on flat terrain and also configured to attach to an axle at a position offset from the center of the wheel for better mobility on rougher terrain.

In one example, each wheel includes a plurality of axle boxes spaced along a radius of the wheel. One axle box is at or proximate the center of the wheel and one axle box is at or proximate the rim of the wheel. There may be at least one intermediate axle box between the center axle box and the rim axle box.

In another example, a subsystem automatically changes the configuration of each wheel. In one embodiment, that subsystem includes an actuator for driving the axle between a center mount position and an offset position.

A controller is configured to alternatively actuate said wheels according to a first algorithm when the wheels are mounted at or proximate their centers and to operate said wheels according to a second algorithm when said wheels are not mounted at or proximate their centers. Typically, the second algorithm drives the wheels in an alternating tripod fashion. At least one wheel may include an integral flipper. Also, the axles may be located mid-height to permit inverted robot operation.

A robot in accordance with this invention includes wheels configured to be attached to the robot at or proximate the center of the wheel for efficient mobility on flat terrain and to be attached at a position offset from the center of the wheel for better mobility on rough terrain. A controller is configured to alternately actuate the wheels according to a first algorithm when the wheels are attached to the robot at or proximate the center of the wheels and to operate said wheels according to a second algorithm when the wheels are attached to the robot at a position offset from the center of the wheels.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
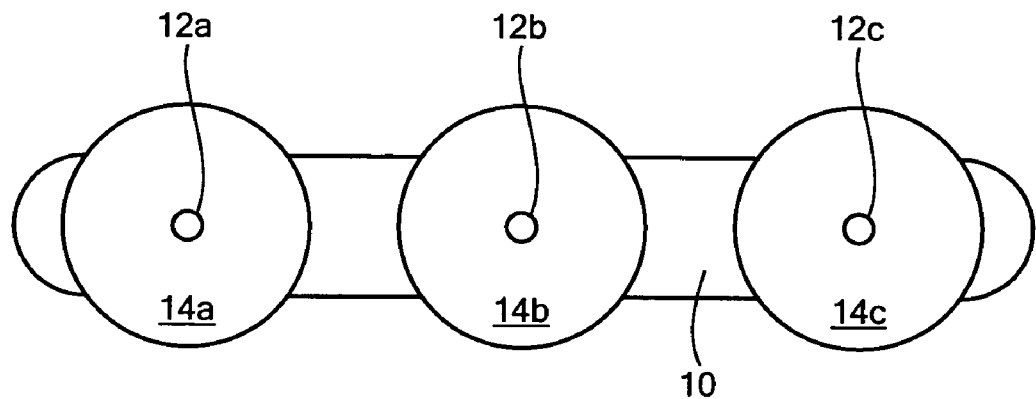
FIG. 1 is a highly schematic side view showing an example of a robot in accordance with the subject invention in a flat terrain configuration.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts an example of a robot body 10 in accordance with the subject invention including three drive axles 12a, 12b, and 12c on each side of the robot. See also FIG. 3.

Figure 2:
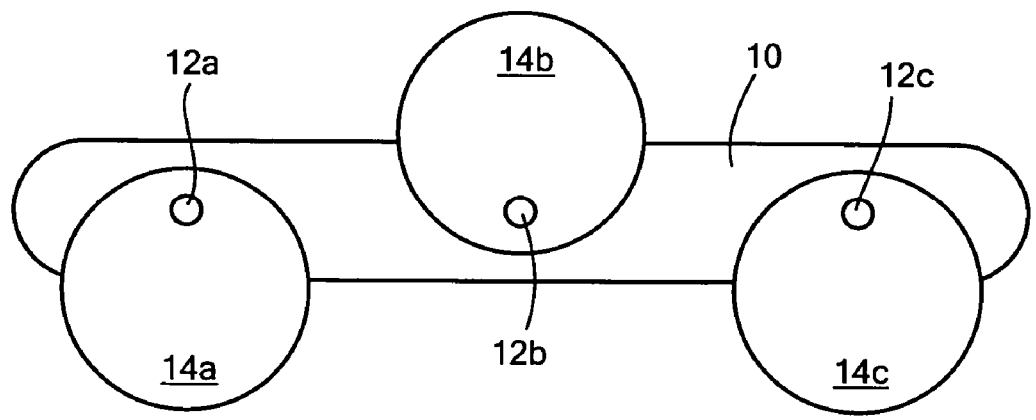
FIG. 2 is a highly schematic side view of the robot of FIG. 1 now configured to traverse rough terrain.
Figure 4:
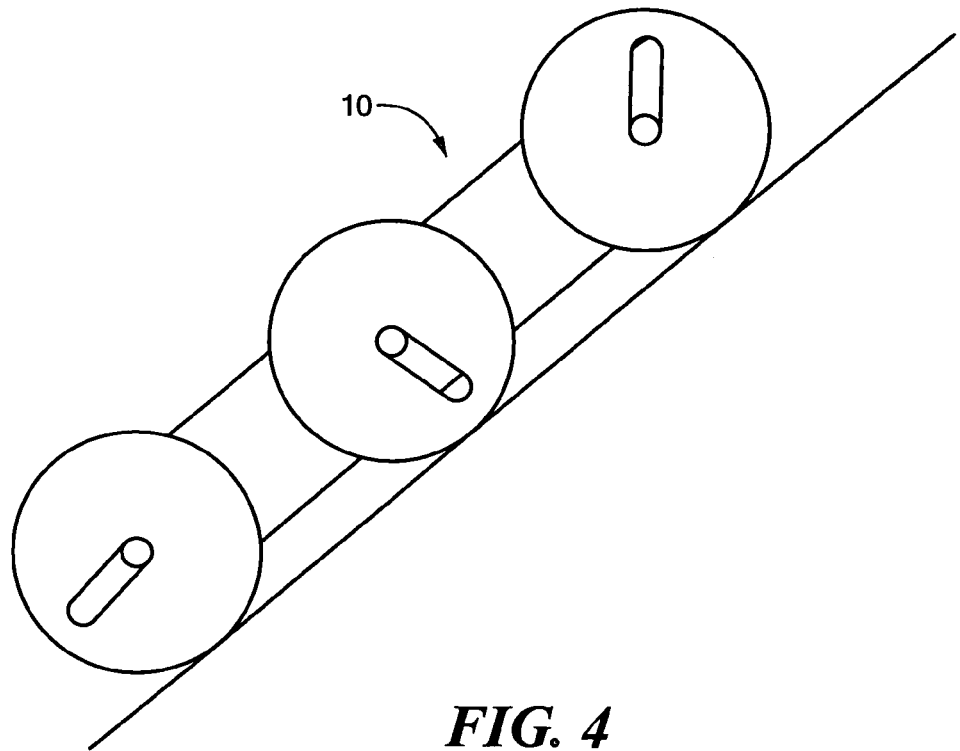
FIG. 4 is a schematic side view showing the robot of FIG. 1 traversing relatively flat terrain.
Figure 5:
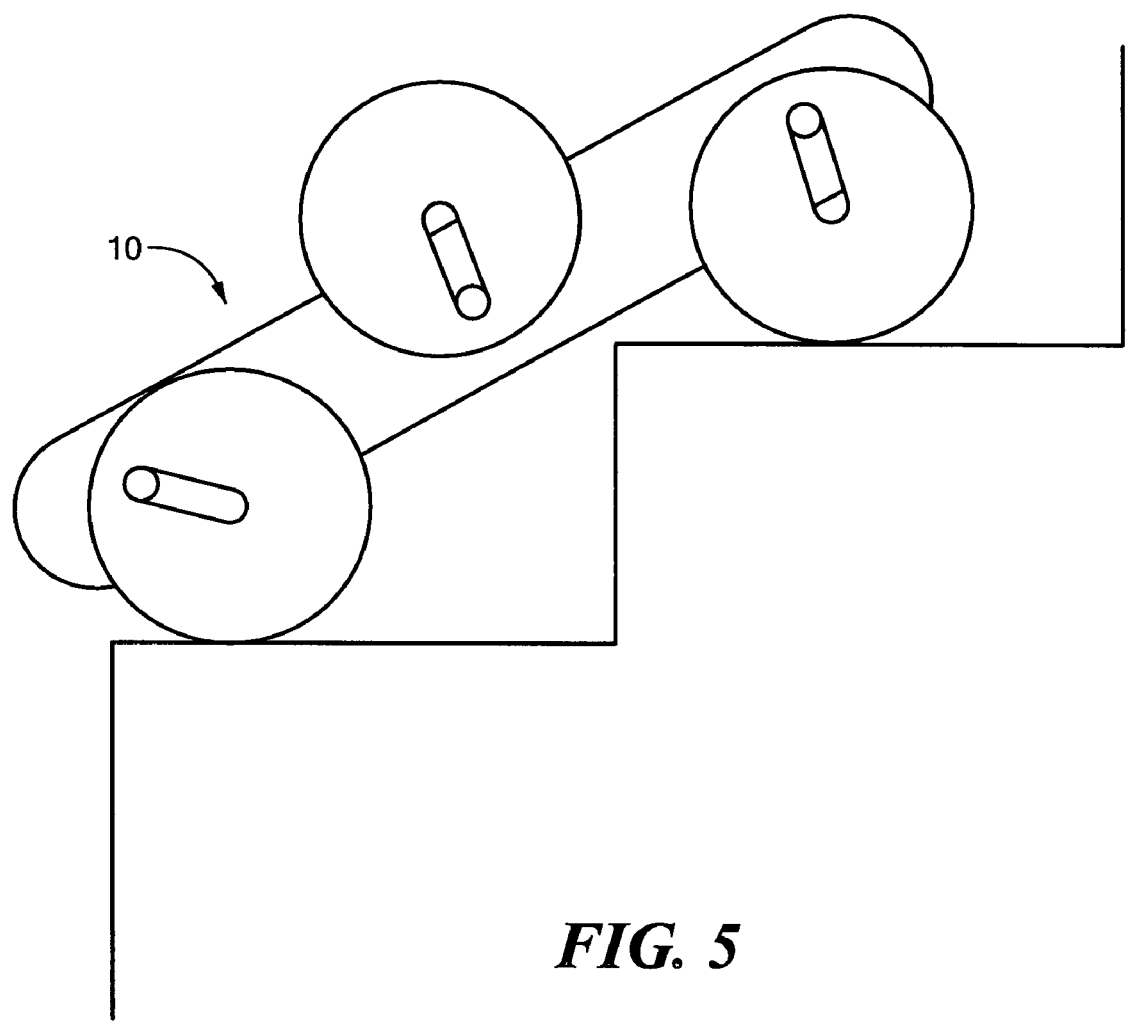
FIG. 5 is a schematic side view showing the robot of FIG. 2 climbing stairs.
Figure 6:
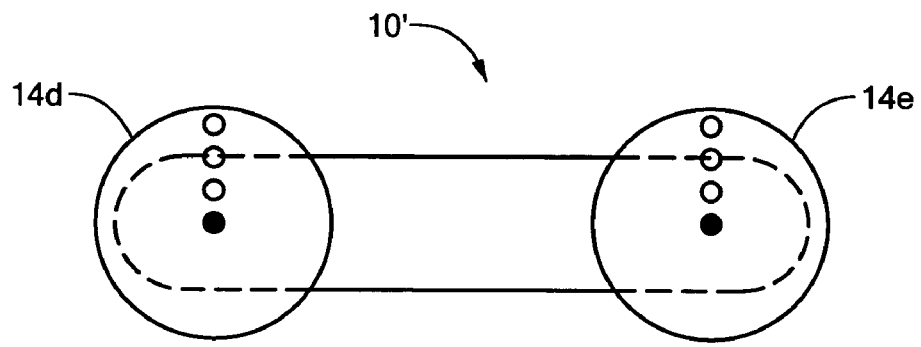
FIG. 6 is a schematic side view of another robot in accordance with this invention configured for relatively flat terrain operation.
Figure 7:
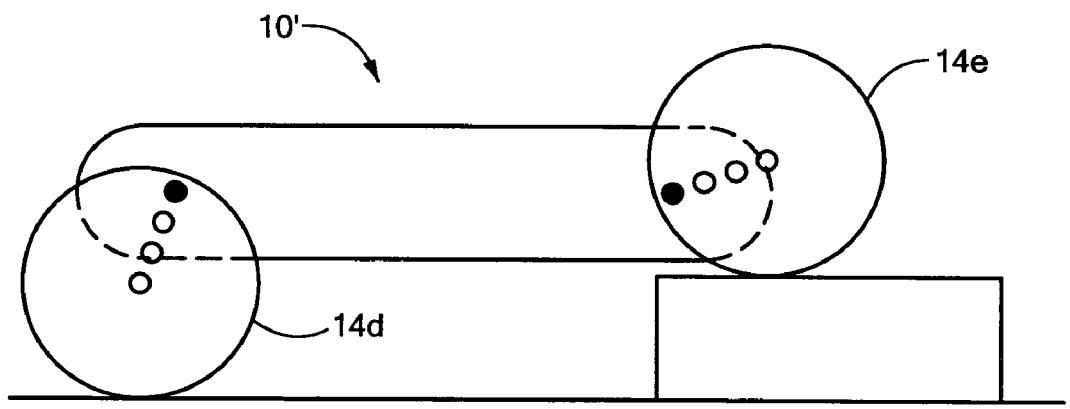
FIG. 7 is a schematic side view of the robot of FIG. 6 now configured for difficult terrain operation.

In accordance with this invention, the wheels 14a, 14b, and 14c of the robot can be center mounted on axles 12a, 12b, and 12c for efficient travel on flat terrain or, as shown in FIG. 2, wheels 14a, 14b, and 14c can be mounted to axles 12a, 12b, and 12c at a position offset from the center of each wheel for better mobility on rougher terrain. Selected or all wheels are thus configured to be alternately attached to an axle at or proximate the center of the wheel for highly efficient mobility on flat terrain and also configured to be attached to an axle at a position offset from the center of the wheel for better mobility on rougher terrain. FIG. 4 shows robot 10 configured with center mounted wheels as shown in FIG. 1 traversing fairly easy terrain with the wheels center mounted while FIG. 5 shows robot 10 configured with rim mounted wheels climbing stairs. FIG. 6 shows a robot 10' with only four axles and two center mounted wheels 14d and 14e while FIG. 7 shows robot 10' now configured with rim mounted wheels 14d and 14e on each side for traversing more difficult terrain. If the axels of this robot are approximately mid-height and the wheels clear the body as shown, inverted operation is possible.

Figure 8:
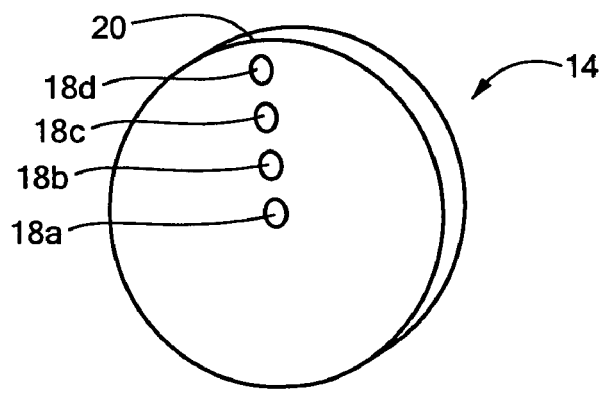
FIG. 8 is a highly schematic three-dimensional view showing an example of a robot wheel in accordance with the subject invention.

In the simplest design, each wheel 14, FIG. 8 includes center axle mount or box 18a which may be a journal or just an orifice and also offset axle boxes 18b, 18c, and 18d. Axle box 18d is most proximate rim 20 of wheel 14 and axle boxes 18b and 18c are intermediate axle boxes between center axle box 18a and rim axle box 18d. The intermediate axle boxes can be spaced along a radius of the wheel. In FIG. 1, each wheel 14 of the robot is mounted on its respective axle 12 via the center axle box 18a, FIG. 4 of each wheel. In FIG. 2, each wheel of the robot is mounted on its respective axle 12 via the rim axle box 18d, FIG. 4. All or selected wheels may also be mounted to their respective axles via axle boxes 18b and/or 18c.

In this way, the user of the robot can manually select the configuration shown in FIG. 1 for gentle or flat terrain and then remove the wheels from their respective axles and reinstall them in the configuration shown in FIG. 2 for the situation where the robot is required to traverse more difficult terrain.

Figure 9:
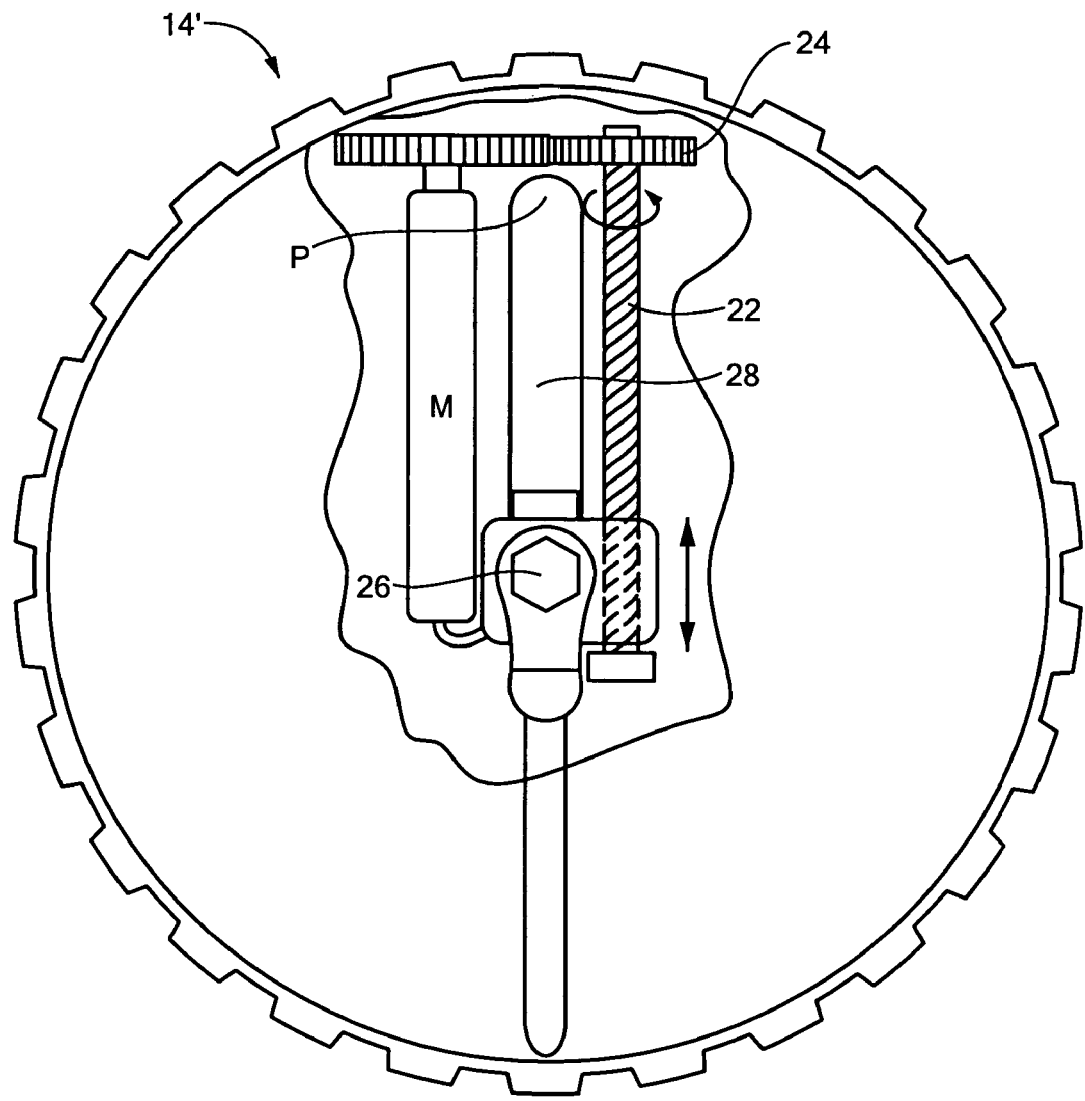
FIG. 9 is a schematic side view of another example of a reconfigurable robot wheel in accordance with this invention.

In a more complex design, there is a mechanical or other subsystem for automatically changing the mount position of all or selected wheels through linear translation. Wheel 14', FIG. 9 includes an actuator such as motor M which drives ball screw 22 via belt or gear 24. Axle mount 26 is driven by screw 22 and can be positioned in journal 28 at any position between the center of the wheel as shown in FIG. 9 and point P proximate the rim of wheel 14'.

Figure 10:
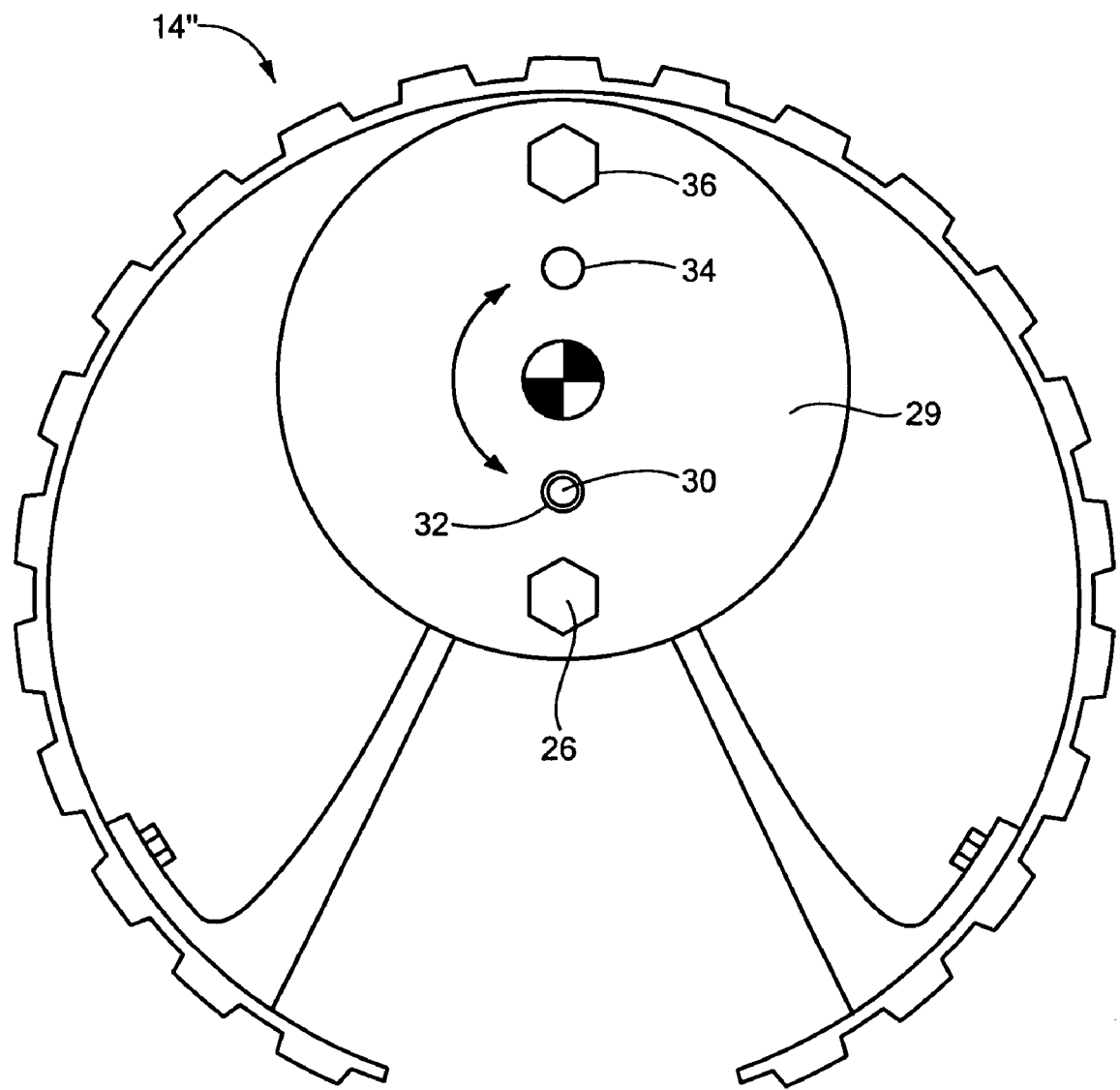
FIG. 10 is a schematic side of still another example of a robot wheel in accordance with this invention.

In another design, wheel 14", FIG. 10 includes lock pin 30 receivable in either orifice 32 of hub 29 as shown for a center mounted axle 26 or orifice 34 for rotationally repositioning axle 26 to a position proximate the rim shown in phantom at 36.

Figure 3:
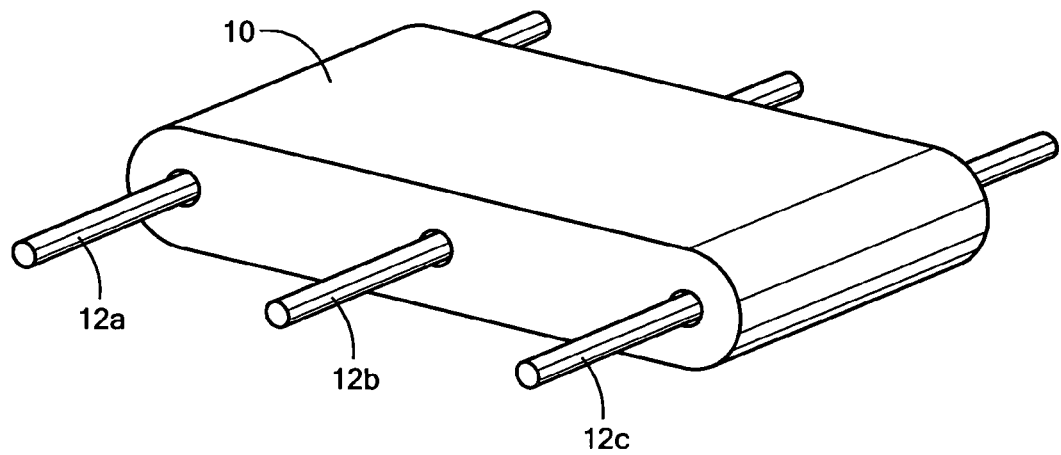
FIG. 3 is a highly schematic three-dimensional view showing a robot in accordance with the subject invention with the wheels removed.
Figure 11:
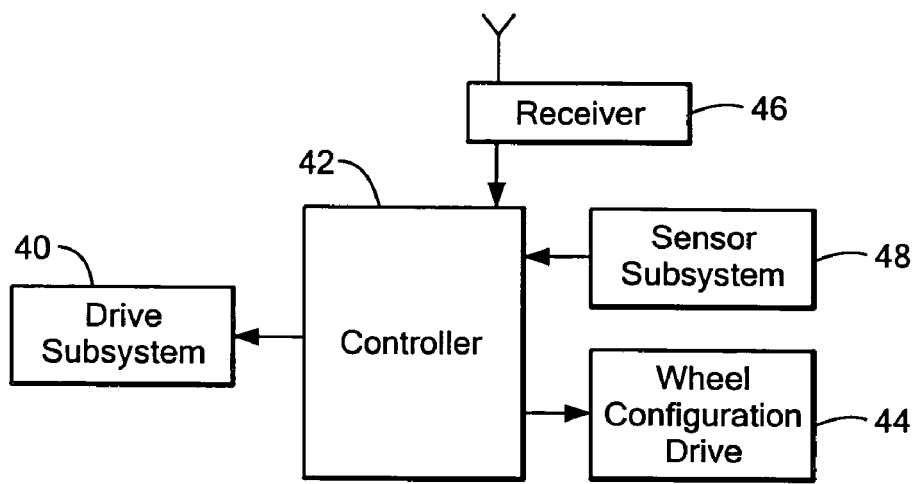
FIG. 11 is a block diagram showing the primary electronic components associated with a typical robot in accordance with the subject invention.

As shown in FIG. 11, one example of an electronic subsystem for a robot in accordance with the subject invention typically includes drive subsystem 40 which drives axles 12, FIGS. 1-3. Controller 42 controls the rate and operation of each axle. Wheel configuration drive 44, also under the control of controller 42, controls the mechanism which changes the wheel configuration from a center mount configuration (FIG. 1) to a rim mount configuration (FIG. 2) and vice versa. For example, drive 44, in one embodiment, is or includes motor M, FIG. 9. This change can be effected by remote control based on a signal received by receiver 46 and processed by controller 42 and/or based on signals sent to controller 42 by sensor subsystem 48 which is configured to detect the condition of the terrain the robot is expected to traverse. When sensor subsystem 48 detects rough terrain and presently the wheels of the robot are configured for smooth terrain operation as shown in FIG. 1, controller 42 receives an indication from sensor subsystem 48 and activates wheel configuration drive 44 to automatically reconfigure the wheels to the configuration shown in FIG. 2. Controller 42 may then control drive subsystem 40 (e.g., the motors and/or actuators of each of the six axles) according to, for example, a rough terrain alternating tripod gate algorithm as set forth in U.S. Pat. No. 6,481,513 in the embodiment where the robot is configured with six wheels.

When smooth terrain operation is later desirable as, for example, when a signal is received by remote control at receiver 46 and/or sensor subsystem 48, controller 42 will activate wheel configuration drive 44 to automatically reconfigure the wheels to the configuration shown in FIG. 1. Then control drive subsystem 40 according to a smooth terrain algorithm wherein, for example, all the axles are driven by their respective motors at a constant and/or equal rate.

Figure 12:
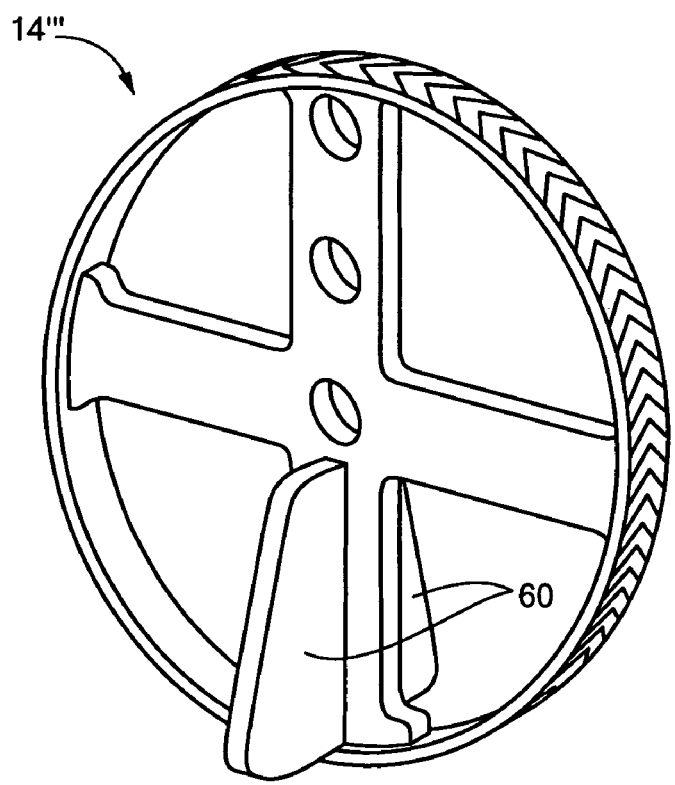
FIG. 12 is a schematic three-dimensional view showing a robot wheel in accordance with the subject invention adapted for operation in aquatic environments.
Figure 13:
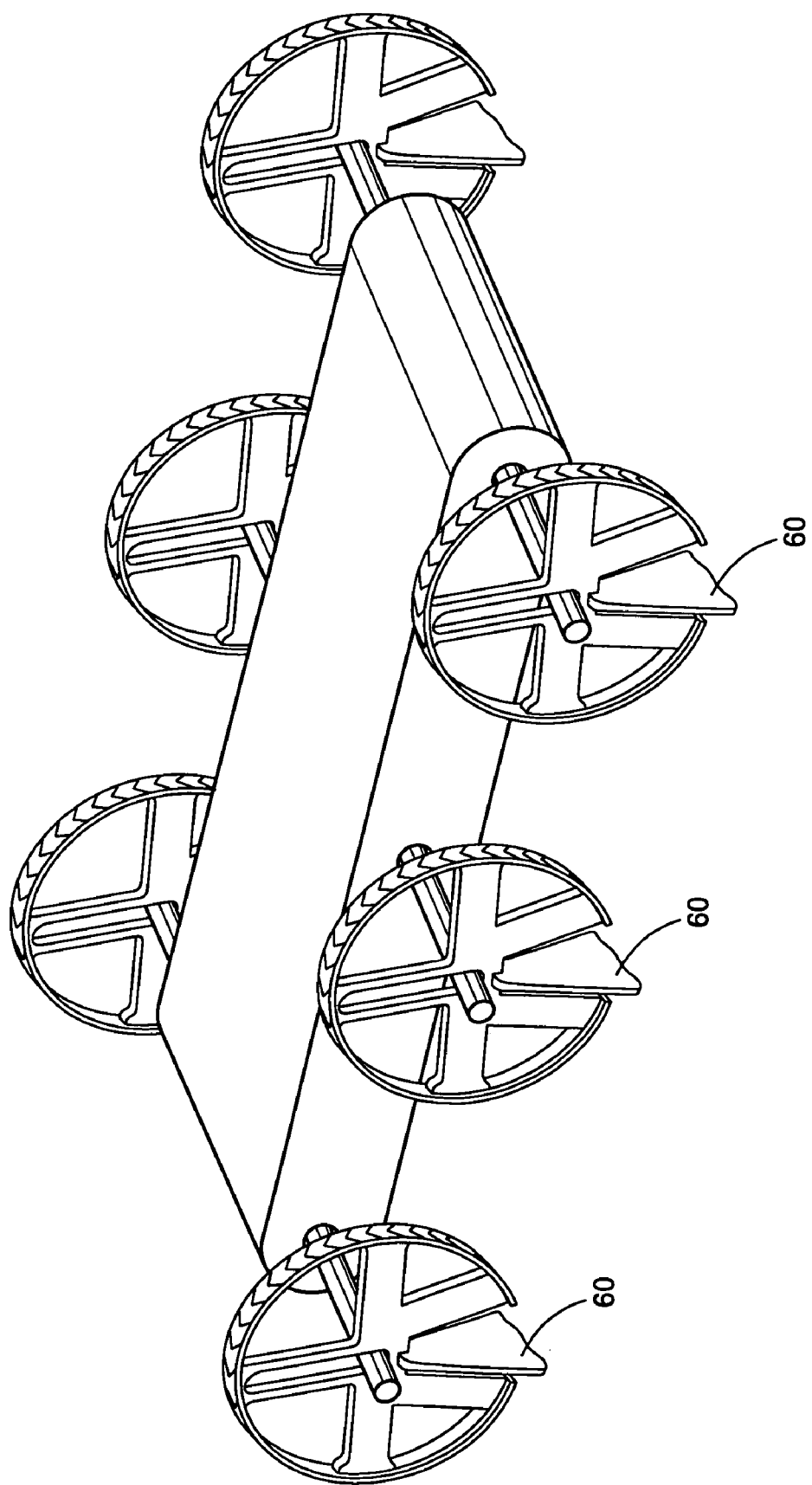
FIG. 13 is a schematic three dimensional view showing a robot with wheels including fins.
Figure 14:
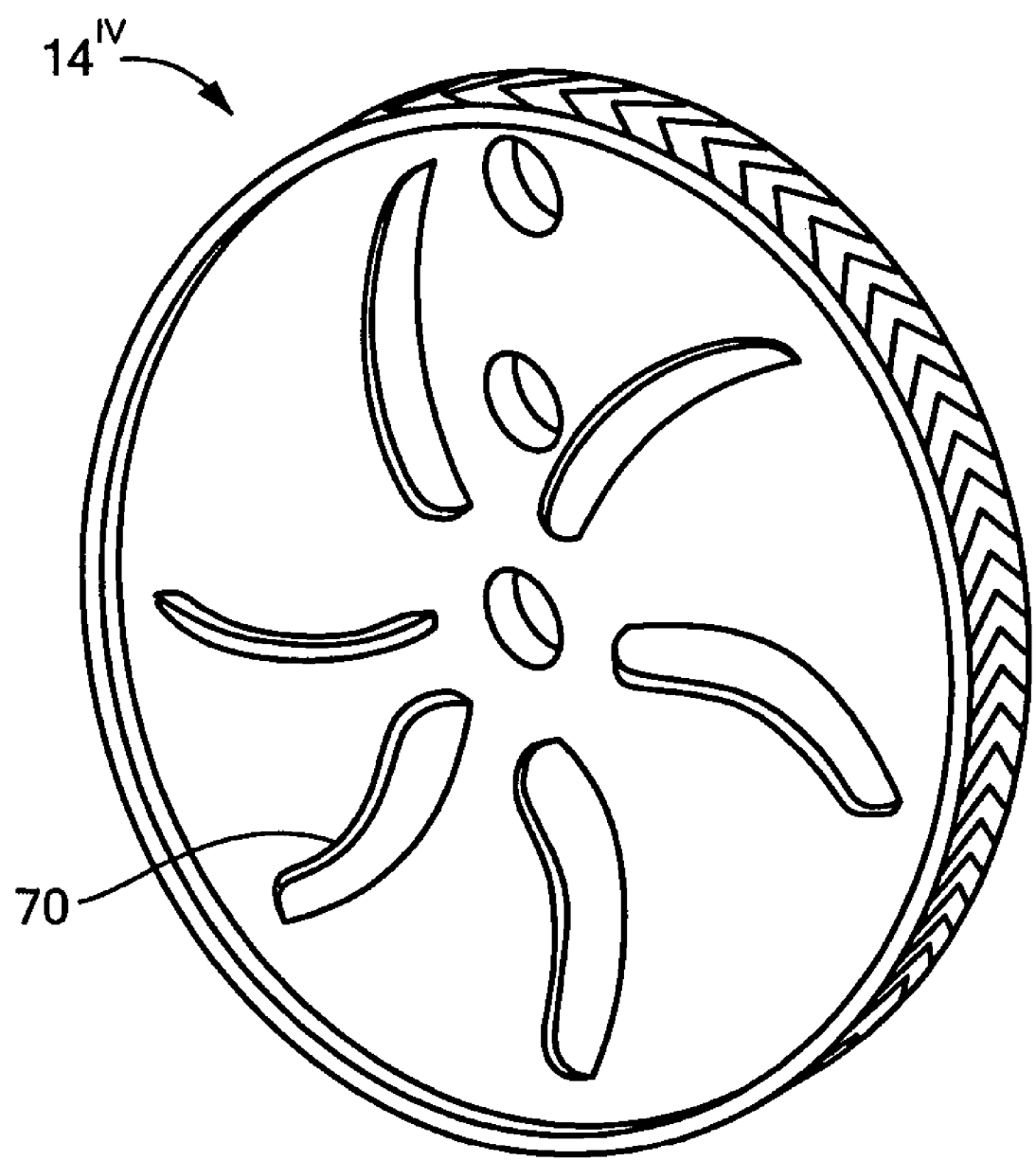
FIG. 14 is a schematic three-dimensional view showing a robot wheel with propeller like features.

For operation in aquatic and terrestrial environments, the wheels of the robot can include propulsion features. For example, wheel 14''', FIG. 12 incorporates flipper 60. When swimming on the surface is desired, a design with built-in propellers can be employed and they are used to both propel and direct the movement of the robot. When swimming underwater is desired, the design with built-in flippers 60 as shown in FIG. 13 is employed and they are used to generate independent thrust. Each wheel (with an integrated flipper) is pointed generally such that the flipper points in the direction thrust is desired. Then the wheel is oscillated such that the flipper generates thrust in that direction. By combining the thrust of several independent wheel motions, the robot can be both propelled through the water and directed in arbitrary directions: up/down (pitch), left/right (yaw) and roll. Wheels with flippers and/or propellers can be configured as shown in FIG. 8, 9, or 10. Each wheel has built-in features, that, when properly actuated, produce aquatic propulsion. One specific instantiation is a built-in flipper. Each wheel with an integrated flipper is pointed generally so the flipper produces thrust in the desired direction. Other integrated wheel structures have propeller-like features, like as shown at 70 in FIG. 14 for wheel $14^{IV}$ that produce thrust when actuated.

The result in the preferred embodiment is a highly versatile robot able to traverse rough terrain but also efficient when deployed on relatively flat terrain. The robot can be configured differently, manually or automatically, for operation on flat terrain and rough terrain. The robot of this invention can also be used in aquatic environments. The wheels of the robot can be attached to their corresponding axles at or proximate the center of each wheel and the robot is now more efficient on flat terrain. The wheels can also be attached or moved such that their respective axles are positioned offset from the center of the wheel and the robot is now able to traverse rougher terrain.

Although specific features of the invention are shown in some drawings and not in others, this is for convenience only as each feature may be combined with any or all of the other features in accordance with the invention. For example, the robot can include more or less than six wheels and various mechanisms can be used to adjust the position of each or selected wheels. Thus, the words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A robot comprising:
    a robot body;
    a plurality of wheels on the robot body for propelling the robot body;
    an axle for each wheel; and
    each wheel configured to alternately attach to an axle at or proximate the center of the wheel for high efficiency mobility on flat terrain and also configured to attach to an axle at a position offset from the center of the wheel for better mobility on rougher terrain.
2. The robot of claim 1 in which each wheel includes a plurality of axle boxes spaced along a radius of the wheel.
3. The robot of claim 2 in which one axle box is at or proximate the center of the wheel and one axle box is at or proximate the rim of the wheel.
4. The robot of claim 3 further including at least one intermediate axle box between the center axle box and the rim axle box.
5. The robot of claim 1 further including a subsystem for automatically changing the configuration of each wheel.
6. The robot of claim 5 in which said subsystem includes an actuator for driving the axle between a center mount position and an offset position.
7. The robot of claim 1 further including a controller configured to alternatively actuate said wheels according to a first algorithm when the wheels are mounted at or proximate their centers and to operate said wheels according to a second algorithm when said wheels are not mounted at or proximate their centers.
8. The robot of claim 7 in which the second algorithm drives said wheels in an alternating tripod fashion.
9. The robot of claim 1 in which at least one said wheel includes an integral flipper.
10. The robot of claim 1 in which said axles are located to permit inverted robot operation.
11. A robot comprising:
    wheels configured to be attached to the robot at or proximate the center of the wheel for efficient mobility on flat terrain and to be attached at a position offset from the center of the wheel for better mobility on rough terrain; and
    a controller configured to alternately actuate said wheels according to a first algorithm when the wheels are attached to the robot at or proximate the center of the wheels and to operate said wheels according to a second algorithm when the wheels are attached to the robot at a position offset from the center of the wheels.
12. The robot of claim 11 in which said second algorithm drives said wheels in an alternating tripod fashion.
13. The robot of claim 11 further including a subsystem for automatically changing the configuration of each wheel.
14. The robot of claim 11 in which said subsystem includes an actuator for driving the axle between a center mount position and an offset position.
15. The robot of claim 11 in which at least one said wheel includes an integral geometry which produces aquatic propulsion.

* * * * *